US008921463B1

(12) United States Patent
Alqahtani et al.

(10) Patent No.: US 8,921,463 B1
(45) Date of Patent: Dec. 30, 2014

(54) SYNTHETIC AGGREGATE FOR USE IN CONCRETE

(71) Applicants: Fahad Khshim Alqahtani, Riyadh (SA); Mohammad Iqbal Khan, Riyadh (SA); Gurmel Ghataora, Birmingham (GB)

(72) Inventors: Fahad Khshim Alqahtani, Riyadh (SA); Mohammad Iqbal Khan, Riyadh (SA); Gurmel Ghataora, Birmingham (GB)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 14/280,551

(22) Filed: May 16, 2014

(51) Int. Cl.
*C04B 28/04* (2006.01)
*C04B 28/26* (2006.01)

(52) U.S. Cl.
USPC ............................................. 524/8; 524/442

(58) Field of Classification Search
USPC ....................................................... 524/8, 442
See application file for complete search history.

(56) References Cited

U.S. PATENT DOCUMENTS

| | | | |
|---|---|---|---|
| 6,749,680 B1 | 6/2004 | Von Fay et al. | |
| 7,473,311 B2 | 1/2009 | Raponi | |
| 2003/0065082 A1* | 4/2003 | Blanken et al. | 524/492 |
| 2006/0106191 A1 | 5/2006 | Lo Presti et al. | |

FOREIGN PATENT DOCUMENTS

| | | | |
|---|---|---|---|
| CN | 102976663 A | 3/2013 | |
| JP | 2009196822 A | 9/2009 | |
| WO | WO 2005/013669 | * 2/2005 | .............. B29C 47/88 |

OTHER PUBLICATIONS

Akçaözoğlu, Semiha, Cengiz Duran Atiş, & Kubilay Akçaözoğlu. "*An Investigation on the Use of Shredded Waste PET Bottles as Aggregate in Lightweight Concrete.*" Waste Management 30.2 (2010): 285-290.

Asange, Sourabh, et al. "*Low Density Polythene as Additive to Flexible Pavements.*" Coronaa Journal of Science & Technology, vol. 1, No. 1, Oct. 2012.

Rahman, Md Mostafizur, Md Akharul Islam, & Mainuddin Ahmed. "*Recycling of Waste Polymeric Materials as a Partial Replacement for Aggregate in Concrete.*" International Conference on Chemical, Environment & Biological Sciences (ICCEB'2012) Penang, Malaysia, pp. 99-102.

* cited by examiner

*Primary Examiner* — John Uselding
(74) *Attorney, Agent, or Firm* — Richard C. Litman (57) ABSTRACT

The synthetic aggregate for use in concrete is a composite material of recycled plastic having a filler encapsulated in the plastic. The synthetic aggregate includes between 30% and 50% recycled shredded plastic, the balance being filler. The plastic may be linear low-density polyethylene (LLDPE). The filler can include red sand, fly ash and quarry fines. The synthetic aggregate is best used to make concrete with a water-to-cement ratio of at least 0.5. A method of making the synthetic aggregate includes the steps of mixing plastic with filler to form a homogenized mixture, compressing the homogenized mixture in a mold, melting the plastic in the homogenized mixture to form a composite sheet or slab, and shredding the composite sheet or slab to form either coarse or fine aggregates for use in making concrete.

6 Claims, 7 Drawing Sheets

SYNTHETIC AGGREGATE FOR USE IN CONCRETE

BACKGROUND OF THE INVENTION

1. Field of the Invention

The present invention relates generally to concrete, and particularly to a synthetic aggregate for use in concrete, the aggregate being a composite of recycled plastic with a filler encapsulated in the plastic.

2. Description of the Related Art

Concrete is one of the most important and frequently used materials in civil engineering, such as in high-low buildings, bridges, infrastructure and environmental protection facilities. Concrete is a composition of an aggregate and a binder substance. The binder substance and the aggregate are combined by a moistening agent to allow the binder substance to link with aggregate particles and form a solid block. Generally the aggregate or aggregates make up about 60% to 70% of the total concrete volume. Since the properties of the aggregates used in concrete significantly impact the quality of the concrete, the selection and the proportion of the aggregates is very important and should be given careful attention. For example, air-cooled sage is used to replace coarse aggregate materials and fly ash is used to replace fine aggregate materials. Furthermore, aggregates such as silica fume and rice husk ash have been used as supplementary cementing materials. Natural aggregates, such as those mentioned, give concrete certain physical, chemical, and mechanical properties.

However, as a result of environmental concerns, there has been a growing trend for the use of recycled plastic waste as artificial aggregate instead of natural aggregate in the production of concrete. Over the last 30 years, worldwide production of plastic grew by more than 500%. Current annual global production is estimated at over 100 million tons and is expected to increase by 3% a year. In the U.K., 7% of plastics are recycled each year, which is a small quantity when compared to the 275 million tons of natural aggregate used in concrete applications. About 80% of the plastic wastes are either left in stockpiles, as landfill material, or is illegally dumped. Most importantly, much of the non-decaying wastes will remain in the environment for hundreds, perhaps thousands of years. The non-decaying waste will not only cause a waste disposal crisis, but also contribute to significant environmental problems. As such, the possibility of using a synthetic aggregate, such as a recycled plastic as aggregate, instead of a natural aggregate in concrete has received increasing attention in recent years as a solution to the escalating solid waste problem.

However, currently, synthetic aggregate, such as recycled plastic aggregate, does not allow for the same physical, chemical, or even mechanical properties of natural aggregates.

Thus, a synthetic aggregate for use in concrete solving the aforementioned problems is desired.

SUMMARY OF THE INVENTION

The synthetic aggregate for use in concrete is a composite material of recycled plastic having a filler encapsulated in the plastic. The synthetic aggregate includes between 30% and 50% recycled plastic, the balance being filler. The plastic may be linear low-density polyethylene (LLDPE), low density polyethylene (LDPE), high density polyethylene (HDPE), polypropylene or other type of plastic. The filler can include red sand, fly ash, quarry fines, and silica fume. The synthetic aggregate is best used to make concrete with a water-to-cement ratio of at least 0.5.

A method of making synthetic aggregate includes the steps of shredding plastic, mixing the shredded plastic with filler to form a homogenized mixture, compressing the homogenized mixture in a mold, melting the plastic in the homogenized mixture to form a composite sheet or slab, and shredding the composite sheet or slab to form either coarse or fine aggregates for use in making concrete.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

The synthetic aggregate for use in concrete is a composite material of recycled plastic having a filler encapsulated in the plastic. The synthetic aggregate includes between 30% and 50% recycled plastic, the balance being filler. The plastic may be linear low-density polyethylene (LLDPE), low-density polyethylene (LDPE), high-density polyethylene (HDPE), polypropylene, or other recyclable plastics. The filler can include red sand, fly ash, quarry fines, and silica fume. The synthetic aggregate is best used to make concrete with a water-to-cement ratio of at least 0.5. A method of making synthetic aggregate includes the steps of shredding plastic, mixing the shredded plastic with filler to form a homogenized mixture, compressing the homogenized mixture in a mold, melting the plastic in the homogenized mixture to form a composite sheet or slab, and shredding the composite sheet or slab to form either coarse or fine aggregates for use in making concrete.

In order to test the use of recycled plastic as an aggregate in concrete, different samples of the synthetic aggregate were prepared. The synthetic aggregate includes filler and plastic. The filler used in the synthetic aggregate is granular waste, such as red sand, fly ash, or quarry fines. The particles of the filler, such as red sand particles, should have a particle size of 0.15 mm, for example. One manner in which this can be accomplished is by passing the filler, such as red sand, through a sieve. After obtaining the particles of the desired size, the filler should be dried at room temperature. The filler should be free from any contamination.

An example of the type of recycled plastic tested is Linear Low Density Polyethylene (LLDPE). The plastic-filler percentages were adjusted to reach the optimal percentage, as illustrated in Table 1, which shows recycled LLDPE mixed with three different kinds of filler and in two different percentages, leading to six different compositions.

TABLE 1

Composition of LLDPE Composites

| Designation | Plastic Type | Plastic Percentage | Filler Type | Filler Percentage |
|---|---|---|---|---|
| $RP_1F_1A$ | LLDPE | 50 | Red Sand | 50 |
| $RP_1F_2A$ | LLDPE | 50 | Fly Ash | 50 |
| $RP_1F_3A$ | LLDPE | 50 | Quarry Fines | 50 |
| $RP_2F_1A$ | LLDPE | 30 | Red Sand | 70 |
| $RP_2F_2A$ | LLDPE | 30 | Fly Ash | 70 |
| $RP_2F_3A$ | LLDPE | 30 | Quarry Fines | 70 |

Once the filler, such as red sand, is sieved and the fraction with the desired particle size (such as 0.15 mm) is selected, it is dried at room temperature.

The recycled plastic is collected and either sorted into different polymer groups, such as LLDPE, or used "as is" in a mixed stream. Regardless of the type of plastic used, the recycled plastic stream should be separated from non-polymer products (such as wood, glass, or metal) and then shredded and processed by grinding to obtain particles with a maximum size of 1 mm. After the plastic and the filler are dried, they are mixed together within a mixing machine to produce a homogenized mixture.

Figure 1:
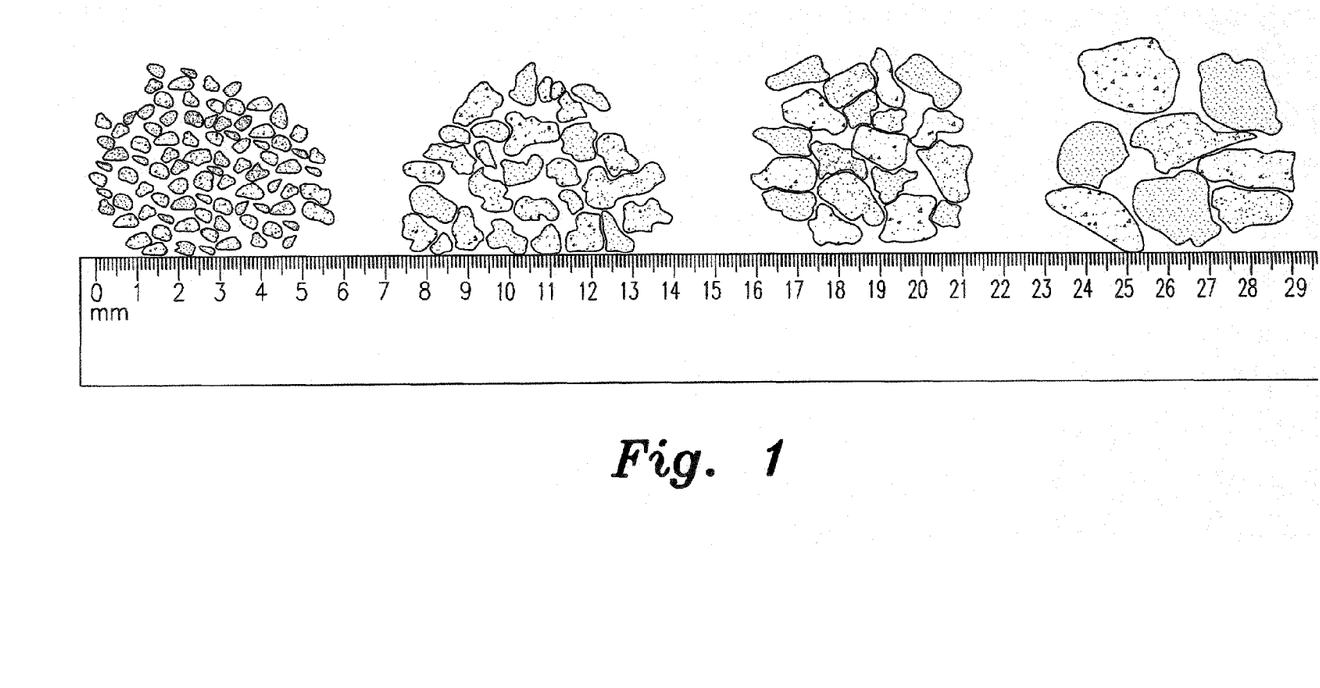
FIG. 1 is an environmental perspective view of samples of a synthetic aggregate for use in concrete according to the present invention, showing synthetic aggregates of different particle sizes.
Figure 7:
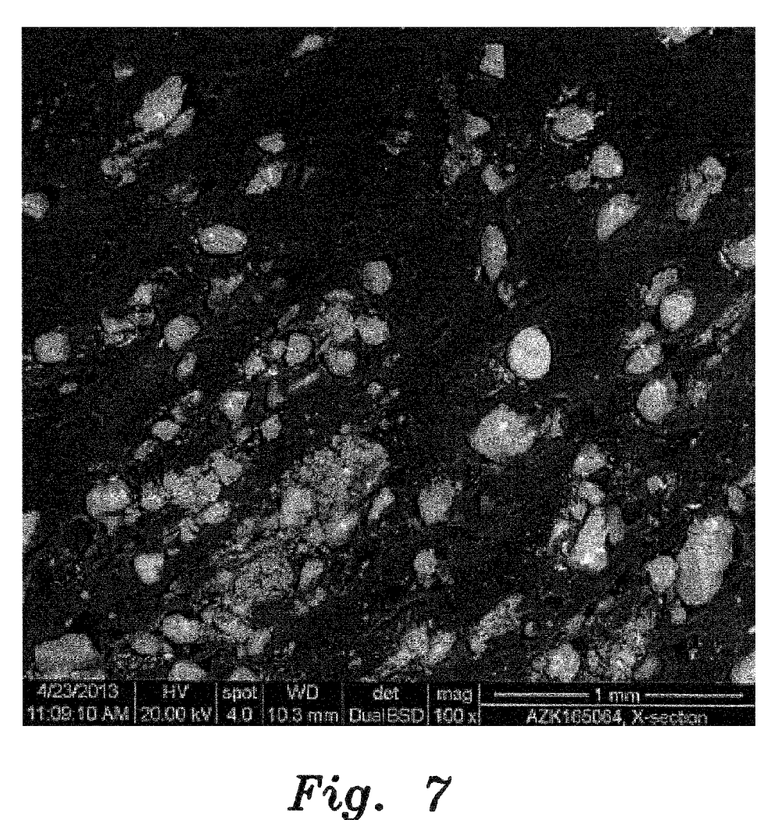
FIG. 7 is a Scanning Electron Micrograph (SEM) of a synthetic aggregate for use in concrete according to the present invention, showing particles of filler encapsulated in a matrix of recycled plastic.

The homogenized mixture is then poured into a flat mold. After it is poured into the flat mold, the homogenized mixture is compressed. To compress the homogenized mixture, the mold containing the polymer-filler mixture is placed between two heated plates in a compression molding machine. The compression molding machine is heated to a temperature of about 175° C., and the polymer-filler mixture is compressed with about 25 tons of force for about 15 minutes. After fully melting the polymer and the subsequent encapsulation of filler, the resulting slab is slowly cooled in the mold through an automatic cooling system in the machine and later removed from the compression molding machine, to be cooled slowly in air at room temperature for about 1 hour. As shown by the SEM micrograph of the surface of the slab in FIG. 7, the process results in a composite material with filler particles embedded in a matrix of recycled plastic. Utilizing a screen created to meet certain specifications, the polymer-filler solid slab is shredded in a plastic shredding machine to form coarse aggregate or fine aggregate at the desired gradation. As illustrated in FIG. 1, the synthetic aggregates obtained by this process are then separated into different sizes to be mixed with cement and make concrete.

As discussed herein, the properties of the materials used in concrete have a great role in determining the quality of the concrete, so it is important to determine the physical, chemical and mechanical properties of the materials used. For illustration purposes only, tests were conducted comparing the various properties of ordinary concrete, lightweight concrete, and concrete comprising a synthetic aggregate prepared as described above. A lightweight concrete is produced as a control using a local lightweight aggregate, which is a type of volcanic rock collected from the western region of Saudi Arabia. The properties of this local lightweight aggregate are tabulated in Table 2.

TABLE 2

Properties of Local Lightweight Aggregate

| Test | Result |
|---|---|
| Bulk Specific Gravity (OD Basis) | 1.41 |
| Bulk Specific Gravity (SSD Basis) | 1.67 |
| Apparent Specific Gravity | 1.41 |
| Absorption (%) | 18.6 |
| Dry Unit weight(dense condition) kg/m$^3$ | 697 |
| Voids (dense condition) (%) | 50 |
| Fineness Modulus | 6.5 |
| Type | Uncrushed |
| Maximum Size | 10 mm |

Recycled plastic was used to replace coarse aggregates for making specimens of concrete with a synthetic aggregate. These synthetic aggregates were manufactured in different sizes, as shown in FIG. 1. The properties of these synthetic aggregates are tabulated in Table 3. The samples are identified by a sample name of the format $RP_xF_yA$, where $RP_x$ is the number identifying the recycled plastic type and percentage, $F_y$ is the number identifying the filler type and percentage, and A is aggregate.

TABLE 3

Properties of Synthetic Aggregates Replacing Coarse Aggregates

| Test | $RP_1F_1A$ | $RP_1F_2A$ | $RP_1F_3A$ | $RP_2F_1A$ | $RP_2F_3A$ |
|---|---|---|---|---|---|
| Bulk Specific Gravity (OD Basis) | 1.2 | 0.81 | 1.08 | 1.56 | 1.19 |
| Bulk Specific Gravity (SSD Basis) | 1.24 | 0.86 | 1.15 | 1.59 | 1.31 |
| Apparent Specific Gravity | 1.25 | 0.86 | 1.16 | 1.62 | 1.35 |
| Absorption (%) | 3.55 | 6.11 | 5.95 | 2.72 | 9.81 |
| Dry Unit weight (dense condition) kg/m$^3$ | 600 | 537.53 | 510.52 | 750 | 529 |
| Voids (dense condition) (%) | 50 | 75 | 52.63 | 51.8 | 55.44 |
| Fineness Modulus | 6.4 | 5.87 | 5.96 | 6.32 | 5.84 |
| Type | Crushed | Crushed | Crushed | Crushed | Crushed |
| Maximum Size | 10 mm | 10 mm | 10 mm | 10 mm | 10 mm |

For those mixes containing synthetic aggregate and/or local lightweight aggregate, the quantity of the coarse aggregate is calculated by using the specific gravity of the synthetic aggregate and/or local lightweight aggregate as a replacement for the specific gravity of natural coarse aggregates. The resultant mix proportions are illustrated in Table 4. In Table 4, the sample designation "NC" means normal concrete, the designation "LWC" means concrete made with the local volcanic lightweight aggregate described above, and the designation "RP$_1$F$_1$C" means synthetic aggregate with recycled plastic 1 (50% recycled LLDPE) and filler 1 (50% sand).

TABLE 4

Mix Proportions for Sample Tests

| S.No | W/C Ratio | Water Kg/m$^3$ | Cement Kg/m$^3$ | Fine Aggregates Kg/m$^3$ | Coarse Aggregates Kg/m$^3$ | Lightweight Aggregates Kg/m$^3$ | Recycled Plastic Aggregates Kg/m$^3$ |
|---|---|---|---|---|---|---|---|
| NC0.5 | 0.5 | 244 | 456 | 768 | 795 | — | — |
| NC0.6 | 0.6 | 245 | 380 | 831 | 795 | — | — |
| LWC0.5 | 0.5 | 300 | 456 | 909 | — | 352 | — |
| LWC0.6 | 0.6 | 300 | 380 | 972 | — | 352 | — |
| RP$_1$F$_1$C0.5 | 0.5 | 245 | 456 | 902 | — | — | 303 |
| RP$_1$F$_1$C0.6 | 0.6 | 245 | 380 | 965 | — | — | 303 |

Concrete mix design can also be used for concrete containing synthetic recycled plastic coarse aggregate by substituting natural coarse aggregate with synthetic recycled plastic coarse aggregate based on required replacement percentage.

The methods in which the tests were conducted are discussed herein and the results of the tests referenced herein illustrate the effect that an specific aggregate can have on certain concrete properties. Specifically, the tests illustrate the relation between unit weight, compressive strength, flexural strength, and tensile strength for all specimens at different water cement ratios.

Comparison of Concrete Densities

Figure 2:
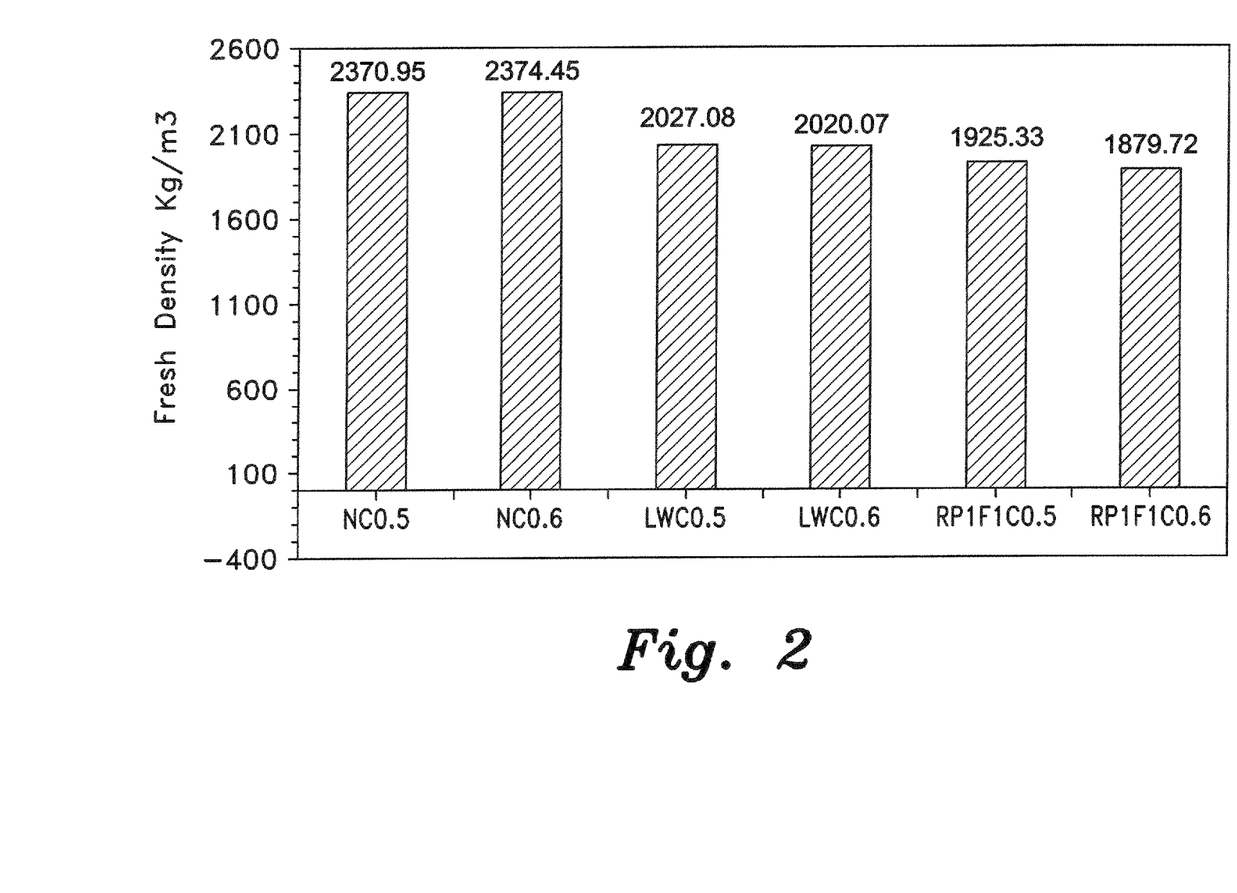
FIG. 2 is graph illustrating a comparison of Fresh Concrete Densities at different water-to-cement ratios for different cementitious compositions, including concrete samples made from a synthetic aggregate for use in concrete according to the present invention.

FIG. 2 illustrates a comparison of the fresh densities of various concrete mixes done in this study. As shown in FIG. 2, the ordinary concrete had achieved a density of 2370 kg/m$^3$ with a water-to-cement ratio of 0.5, (NC0.5), as compared to the concrete with the synthetic aggregate, which had a density of 1880 kg/m$^3$ with a water-to-cement ratio of 0.6, (RP$_1$F$_1$C 0.6), meaning that at a difference of 0.1 water-to-cement ratio, the density of the material used was reduced around 21%.

Referring to FIG. 2, in the 0.5 water-to-cement category, the lowest density was seen with RP$_1$F$_1$C 0.5. It had the density of 1925 kg/m$^3$. This is a substantial reduction of 19%. This reduction is due to the lightweight nature of the synthetic aggregate. By comparison, the lightweight concrete with 0.5 water-to-cement ratio has attained a density 14.5% less than NC0.5.

Compressive Strength Test

Figure 3:
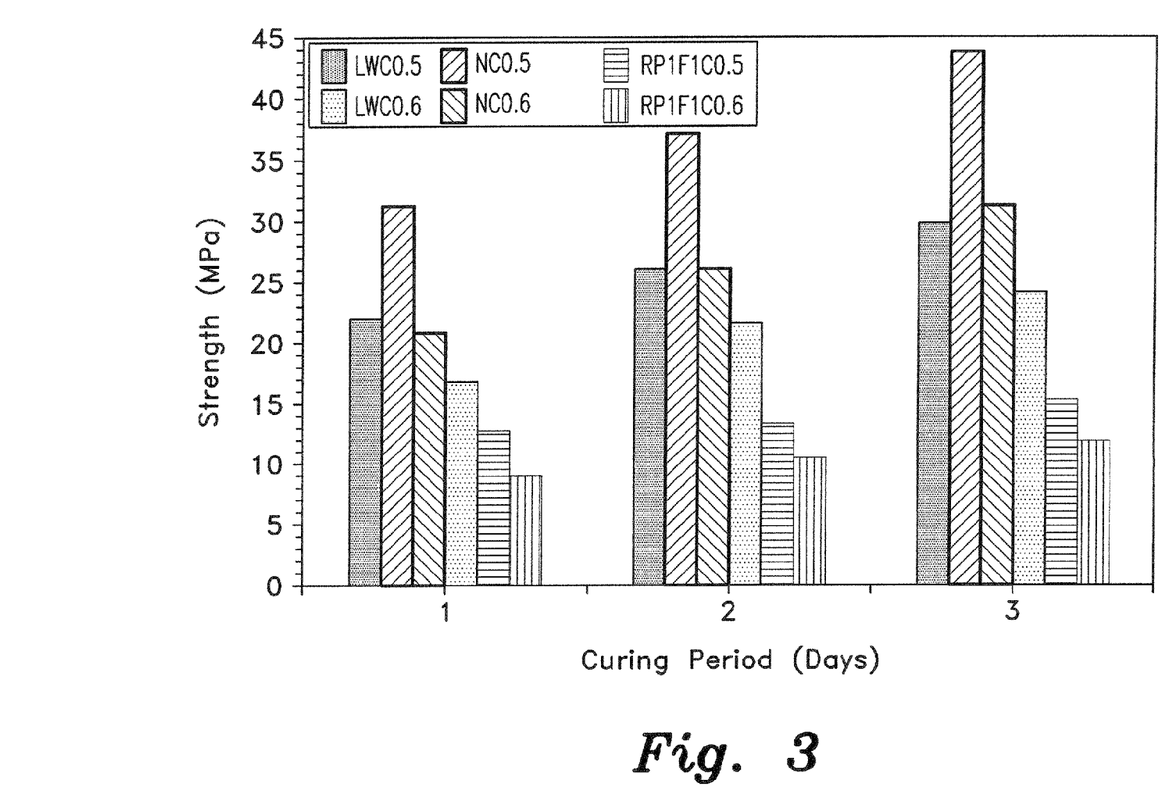
FIG. 3 is chart illustrating a comparison of Compression Strength as a function of curing time for normal, lightweight concrete and concrete having a synthetic aggregate for use in concrete according to the present invention with different water-to-concrete ratios.

FIG. 3 illustrates a comparison of the compressive strengths of each specimen that was prepared by casting the fresh concrete in two layers in steel cubic molds with dimensions of 50×50×50 mm. Each layer was subjected to vibration for 3 seconds. After twenty-four (24) hours, the cubic specimens were demolded and cured in water at a temperature of 20° C.±2° C. for 7, 14 and 28 days, respectively. After the curing process, the cubes were tested by a compressive strength machine to measure the compressive load and compressive strength at which the cubes will fail.

Referring to FIG. 3, the compression strengths of normal, lightweight and concrete containing a synthetic aggregate (RP$_1$F$_1$C) with different water-cement ratios of 0.5 and 0.6 are illustrated. The general trend is that increase in the water-to-cement ratio causes reduction in compressive strength for all mixes. However, the compression strength of all mixes increases with the curing period. Furthermore, the control concrete had the highest strength at all the ages of curing, whereas the lowest strength was observed in RP$_1$F$_1$C.

In the case of 0.5 water-to-cement ratio, at the age of seven days, the strength of the control concrete was 62% higher than the lowest RP$_1$F$_1$C. The lightweight concrete was 30% lower than the control concrete. At the age of fourteen days, the control concrete attained 37.22 MPa, which is 29% and 64% higher in comparison with lightweight and RP$_1$F$_1$C concretes, respectively.

Nevertheless, the same trend is continued at the later stage of the test. At this age, the lowest strength was seen in RP$_1$F$_1$C, which was 64% lower than the control. The same trend was observed at 0.6 water-to-cement ratio, as control concrete achieved the highest strength amongst the rest of the concretes, followed by lightweight concrete and synthetic recycled plastic concrete (RP$_1$F$_1$C), respectively, regardless of the reduction amount due to the increase in water-to-cement ratio. However, the reduction in compression strength due to water-to-cement ratio increase in the concrete containing RPA was about 19% and was affected by curing period.

In fact, the reduction in compression strength is due to the weakness in the bonding between cement mortar and synthetic aggregate particles. This weakness is due to difference in surface texture and size of synthetic plastic aggregate particles.

Tensile Strength Test

The tensile strength of concrete was calculated using the tension machine test. Briquette specimens were made to be tested at twenty-eight days according to BS EN 12390-6: 2009(E). Comparison of tensile strengths for the concrete mixes made with recycled plastics with different water-to-cement ratios are presented in FIG. 4. The general trend is that increase in the water-to-cement ratio decreases tensile strength for all mixes. However, the tensile strength of all mixes increases with the curing period.

Figure 4:
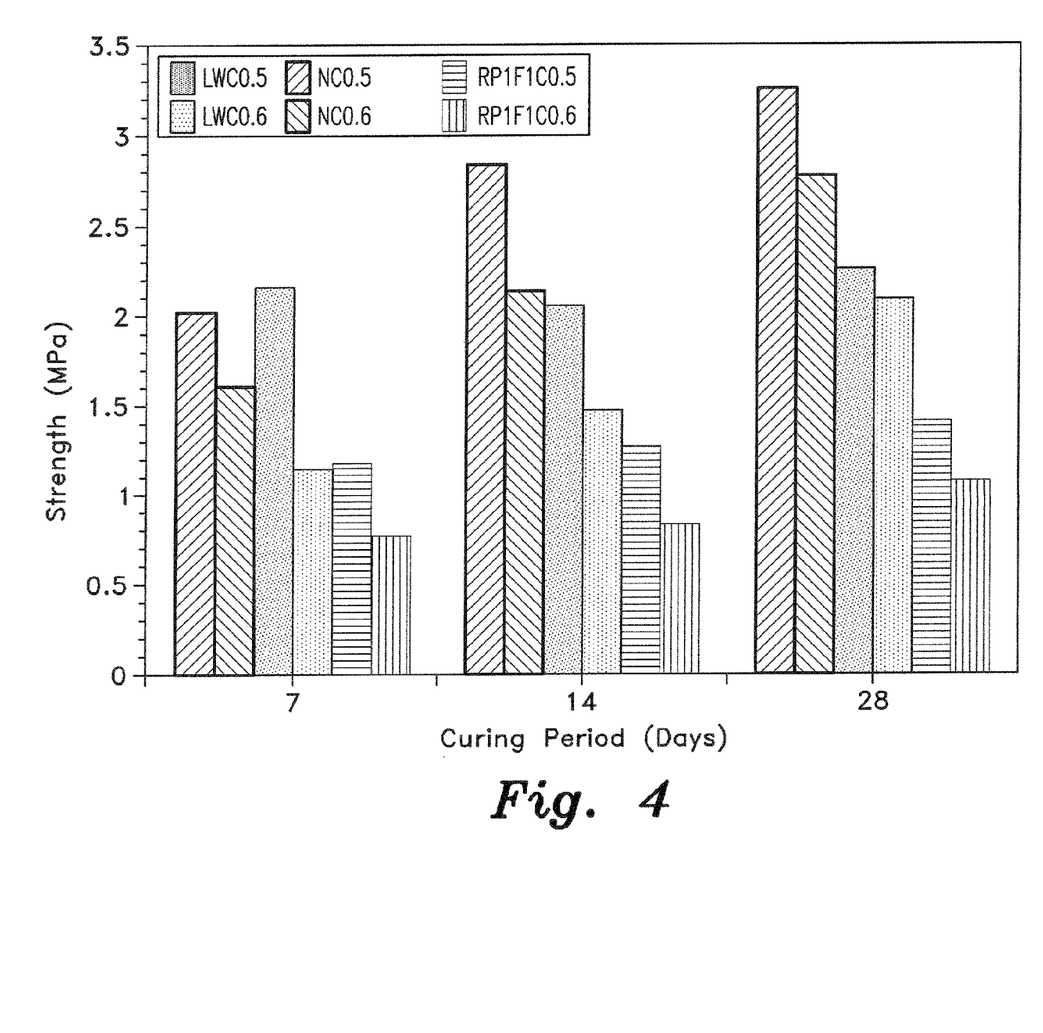
FIG. 4 is a chart illustrating a comparison of Tensile Strength as a function of curing time for normal, lightweight concrete and concrete having a synthetic aggregate for use in concrete according to the present invention with different water-to-concrete ratios.

In the case of a 0.5 water-to-cement ratio, the control concrete reached a maximum of 3.28 MPa at twenty-eight days, showing a 30% increase from seven to fourteen days, and then a 13% increase from fourteen to twenty-eight days. This was followed by the lightweight concrete, whose strength was 6.5% higher at the early age of seven days.

Concrete containing synthetic aggregate (RP$_1$F$_1$C) had 42%, 55% and 57% lower tensile strength than the control concrete at seven, fourteen, and twenty-eight days, respectively. Also, the tensile strength was 45%, 38% and 37% less than the tensile strength of lightweight concrete at seven, fourteen, and twenty-eight days, respectively. The same trend was observed at 0.6 water-to-cement ratio, as control concrete achieved the highest strength amongst the rest, followed by lightweight concrete and the synthetic recycled plastic concrete ($RP_1F_1C$), respectively, regardless of the reduction amount due to increase in the water-to-cement ratio. However, the reduction in tensile strength due to water-to-cement ratio increase in the RPA concrete was around 31%.

The factors causing reduction in the tensile strength in concrete containing synthetic plastic aggregate are the same as that which cause reduction in compressive strength, stated previously. In addition, the increase in porosity due to the adding of plastic aggregate causes more voids and makes the bonding weaker.

Flexural Strength Test

Using a simple beam (Prism) with one point loading, the flexural strength specimens were prepared by casting the fresh concrete in two layers in steel prism beam molds with dimension 160×50×50 mm, in which each layer was subjected to vibration for three (3) seconds. After twenty-four (24) hours, the beam specimens were demolded, and cured in water at a temperature of 20° C.±2° C. for seven, fourteen, and twenty-eight days. After the curing process, the beams were tested by flexural strength machine to measure the flexural load and strength at which the beams will fail.

Figure 5:
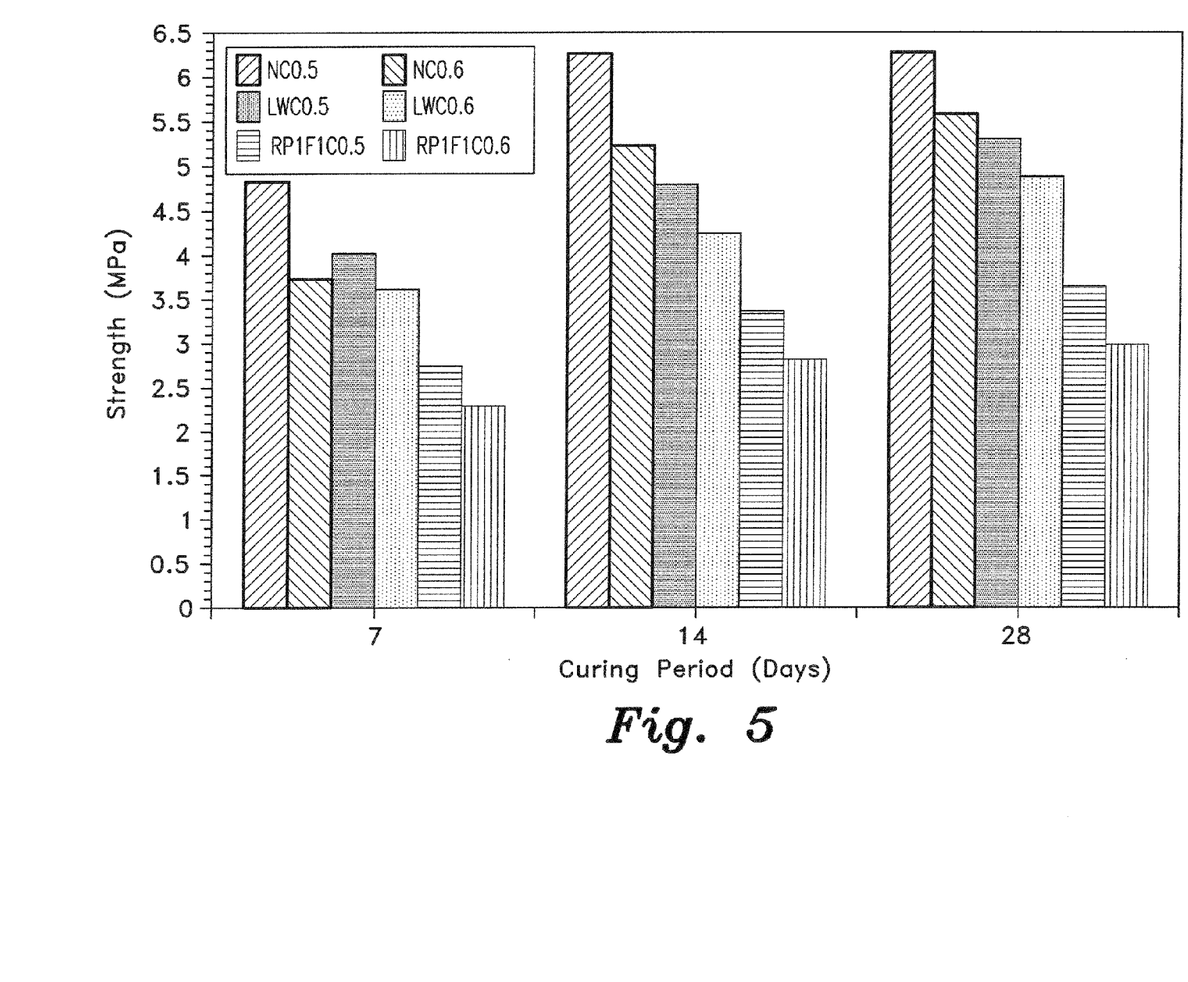
FIG. 5 is a chart illustrating a comparison of Flexural Strength as a function of curing time for normal, lightweight concrete and concrete having a synthetic aggregate for use in concrete according to the present invention with different water-to-concrete ratios.

As illustrated in FIG. 5, a comparison of flexural strengths of control, lightweight, and synthetic recycled plastic ($RP_1F_1C$) concrete cast at water-to-cement ratios of 0.5 and 0.6 is shown. The general trend is that an increase in the water-to-cement ratio decreases flexural strength for all mixes. However, the flexural strength of all mixes increases with the curing period.

In the case of 0.5 water-to-cement ratio, control concrete had a flexural strength 16% higher than the lightweight concrete at an initial age of seven days. Meanwhile, in comparison, the synthetic recycled plastic concrete $RP_1F_1C$ had a flexural strength 43% lower at the same initial age. At the later age of twenty-eight days, the control concrete has flexural strength 16% and 42% higher than the other (lightweight and $RP_1F_1C$) concretes, respectively. The same trend was observed at 0.6 water-to-cement ratio, as control concrete achieved a flexural strength 13% and 47% higher than lightweight and $RP_1F_1A$ concrete, respectively. The reduction in flexural strength was around 44.5% for $RP_1F_1C$ due to the incorporation of synthetic aggregate, regardless of the increase in the water-to-cement ratio. However, the reduction in flexural strength due to water-to-cement ratio increase in concrete containing RPA was 17% and was not affected by curing period.

The reason behind this reduction is the same as that for compressive strength reduction, as mentioned earlier. Moreover, there are two main reasons for reduction in flexural strength of such concrete. One is a decrease in the amount of solid material carrying load, which was replaced by RPA (recycled plastic aggregate. The second reason is concentration of stresses around the boundaries of recycled plastic aggregates.

Chloride Permeability

Figure 6:
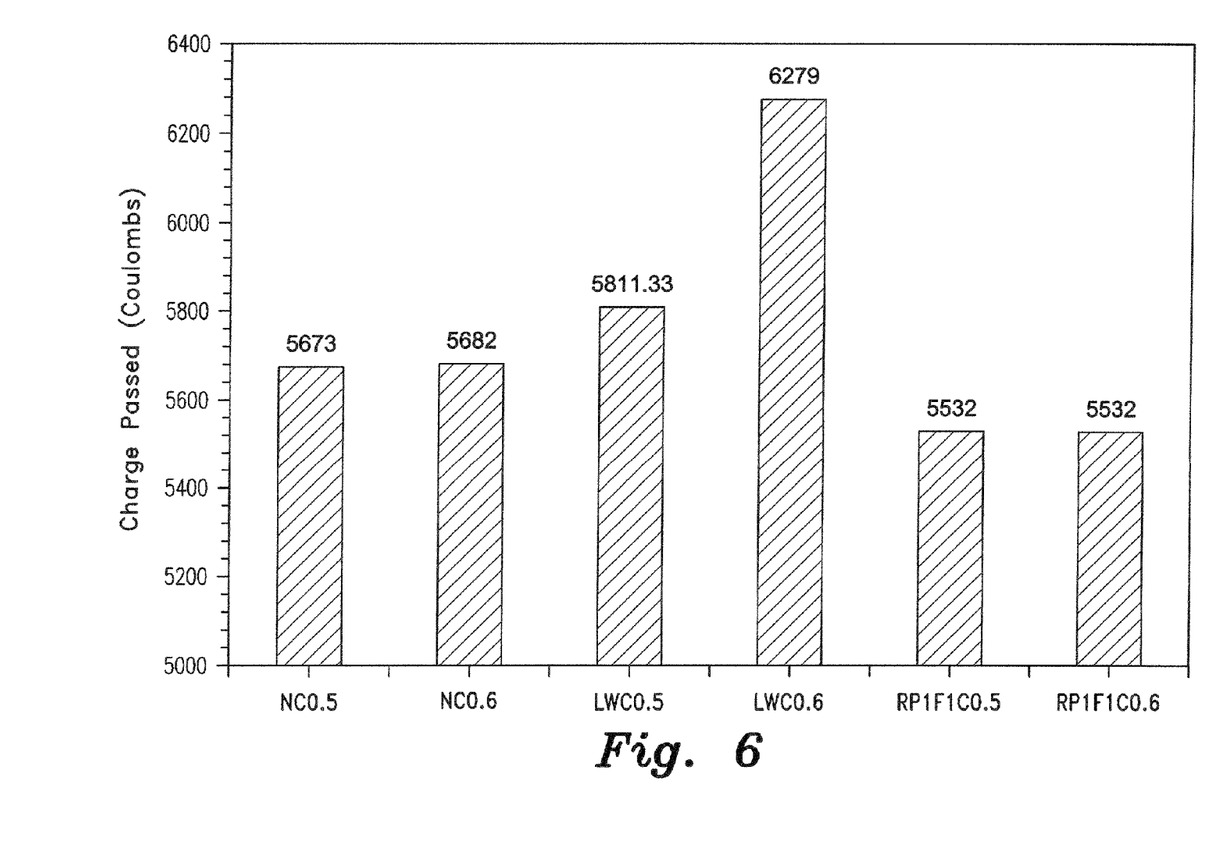
FIG. 6 is a chart illustrating a comparison of chloride permeability for normal, lightweight concrete and concrete containing a synthetic aggregate for use in concrete according to the present invention.

FIG. 6 illustrates the effect of concrete type on chloride ion permeability at twenty-eight days. The general trend shows a direct relationship between chloride ion penetrability and water-to-cement ratio. Results show that the chloride ion penetrability of synthetic recycled plastic concrete is 3% and 5% lower than the control and lightweight concrete, respectively, at 100% replacement of natural aggregate by RPA.

This means that the resistance of concrete containing synthetic aggregate to chloride ion penetrability increases with the incorporation of RPA. This is because recycled plastic aggregate particles allow cement to bond into the surface of the aggregate, therefore blocking or distracting the transfer of chloride ions.

The synthetic aggregates can be used as a total replacement of the ordinary aggregates in concrete. Use of plastic aggregate in concrete has certain advantages associated with its light weight and elastic properties. As it is acknowledged that aggregate occupies nearly 70% to 75% of concrete volume, use of higher amounts of plastic will contribute significantly to lightweight concrete, which is useful in applications requiring concrete with a low density, such as pavement, floating structures, and shock absorbing structures. Moreover, the elastic properties of plastic will improve the elasticity of concrete and allow it to resist deformation.

Further, the manufacture of synthetic aggregate using a 70% to 30% sand-to-plastic ratio will allow for low density and better grading, as compared with other synthetic aggregate samples. Moreover, the presence of synthetic aggregate in the concrete makes it more ductile, thereby significantly increasing its deformation before a dramatic failure. The concrete containing this property is more durable and can be utilized in applications that are exposed to severe chemical attack, such as chloride ion penetrability, as RPA particles allow cement to bond into the surface of the aggregate, therefore blocking or distracting the transfer of the ions.

It is to be understood that the present invention is not limited to the embodiments described above, but encompasses any and all embodiments within the scope of the following claims.

We claim:

1. A synthetic aggregate for use in concrete, consisting of a shredded composite material containing between 30% and 50% shredded Linear Low-Density Polyethylene (LLDPE) by weight, the balance being a filler selected from the group consisting of red sand, fly ash, and quarry fines, the filler being embedded in a matrix of the recycled plastic, wherein the composite has a maximum particle size of 10 mm.

2. The synthetic aggregate according to claim 1, wherein the filler is red sand.

3. A method of making concrete using the synthetic aggregate according to claim 1, comprising the steps of:
   mixing cement, water, and the synthetic aggregate according to claim 1, wherein the water-to-cement ratio is between 0.5 and 0.6; and
   curing the mixture.

4. The method of making concrete according to claim 3, wherein the cement comprises Portland cement.

5. The method of making concrete according to claim 3, wherein the synthetic aggregate comprises a coarse aggregate.

6. The method of making concrete according to claim 3, wherein the synthetic aggregate comprises a fine aggregate.

* * * * *